United States Patent [19]

Demlehner et al.

[11] Patent Number: 4,851,047

[45] Date of Patent: Jul. 25, 1989

[54] PROCESS FOR PREPARING WATER-REPELLENT ARTICLES FROM GYPSUM POWDER CONTAINING HYDROPHOBIC AGENTS

[75] Inventors: Ulrich Demlehner, Emmerting; Herbert Eck, Burghausen; Heinrich Hopf, Burghausen; Erich Pilzweger, Burghausen, all of Fed. Rep. of Germany; Otto Zeller, Braunau, Austria

[73] Assignee: Wacker-Chemie GmbH, Munich, Fed. Rep. of Germany

[21] Appl. No.: 141,743

[22] Filed: Jan. 11, 1988

[30] Foreign Application Priority Data

Feb. 12, 1987 [DE] Fed. Rep. of Germany ....... 3704439

[51] Int. Cl.[4] ...................... C04B 24/02; C04B 24/24; C04B 24/42

[52] U.S. Cl. .................................. 106/111; 423/555; 106/109

[58] Field of Search .................. 106/111,109; 423/555

[56] References Cited

U.S. PATENT DOCUMENTS 3,455,710  7/1969  Nitasche et al. .................... 106/111
4,704,416  11/1987  Eck et al. ........................ 106/287.14

Primary Examiner—William R. Dixon, Jr.
Assistant Examiner—David M. Brunsman

[57] ABSTRACT

The present invention relates to gypsum powders containing a hydrophobic agent and to water-repellent articles which are prepared from gypsum containing powered hydrophobic agents, in which the hydropohobic agents are prepared by spray-drying a mixture containing at least water, an organopolysiloxane having Si-bonded hydrogen and a water-soluble, film-forming polymer having a turbidity point of from 35° to 98° C.

4 Claims, No Drawings

PROCESS FOR PREPARING WATER-REPELLENT ARTICLES FROM GYPSUM POWDER CONTAINING HYDROPHOBIC AGENTS

The present invention relates to water repellent articles and more particularly to a process for preparing water-repellent articles from gypsum powder containing hydrophobic agents.

BACKGROUND OF THE INVENTION

Water-repellent articles prepared from compositions containing gypsum and hydrophobic agents, such as organopolysiloxanes are described in U.S. Pat. No. 3,455,710 to Nitzsche et al, in which an aqueous emulsion of an organopolysiloxane containing Si-bonded hydrogen is mixed with gypsum and then molded or otherwise formed into articles having water repellent properties.

Organopolysiloxanes containing Si-bonded hydrogen have been mixed with gypsum powder in the absence of water and upon the addition of water have formed water-repellent molded articles or coatings (Chemical Abstracts, Vol. 89, 1978, 29818 w).

It is an object of the present invention to mix organopolysiloxanes containing Si-bonded hydrogen with gypsum to form water-repellent articles. Another object of the present invention is to provide storage-stable gypsum powders containing hydrophobic agents. Still another object of the present invention is to provide gypsum powders which are free of substances which substantially modify the setting behavior of the gypsum. A further object of the present invention is to provide gypsum powders which do not cause "blooming" on articles prepared from the gypsum powders. A still further object of the present invention is to provide gypsum powders in which only water need be added before final shaping of the articles. A still further object of the present invention is to provide gypsum powders which are free of wetting difficulties even when the organopolysiloxane content is greater than 0.5 percent by weight, based on the weight of the gypsum powder.

SUMMARY OF THE INVENTION

The foregoing objects and others which will become apparent from the following description are accomplished in accordance with this invention, generally speaking, by providing gypsum powders containing hydrophobic agents in which at least a portion of the hydrophobic agent is an organopolysiloxane having Si-bonded hydrogen. The organopolysiloxane containing Si-bonded hydrogen is present in a powder which is obtained by spray-drying a mixture containing at least water, an organopolysiloxane having Si-bonded hydrogen and a water-soluble, film forming polymer having a turbidity point of from 35° to 98° C.

The invention also relates to a process for preparing water-repellent articles from gypsum containing powdered hydrophobic agents in which the powdered hydrophobic agents are obtained by spray-drying a mixture containing at least water, an organopolysiloxane having Si-bonded hydrogen and a water-soluble, film forming polymer having a turbidity point from 35° to 98° C. and thereafter combining the resultant powder with gypsum. The resultant mixture is then combined with water and molded into articles.

DESCRIPTION OF THE INVENTION

The gypsum component to which the powdered hydrophobic agents are added according to this invention, can be, for example, plaster (CaSO$_4\frac{1}{2}$H$_2$O) in the form of, for example, building plaster, plaster of Paris or insulating plaster, or other types of gypsum, such as floor gypsum, Keene's cement, anhydrite or mixtures of plaster and slaked lime.

The organopolysiloxane containing Si-bonded hydrogen which is employed as hydrophobic agents in the process of this invention, or is present in the gypsum powders of this invention, is preferably that of the formula

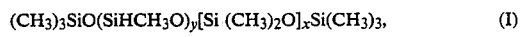

$$(CH_3)_3SiO(SiHCH_3O)_y[Si(CH_3)_2O]_xSi(CH_3)_3, \quad (I)$$

in which x is 0 or an integer having a value of at least 1, and y is an integer having a value of at least 3 and is at least 3 times the value of x, and more preferably at least 13 times the value of x, the sum of x + y being an integer having a value such that the average viscosity of these organopolysiloxanes is from 10 to 25 mm$^2$s$^{-1}$.

Although only one type of such an organopolysiloxane need be used in the process of this invention, it is possible to use mixtures of at least two different types of such organopolysiloxanes in the process of this invention. Accordingly, the powders of this invention may contain only one type of such an organopolysiloxane, or they may contain mixtures of at least two different types of such organopolysiloxanes.

In addition to at least one organopolysiloxane having the above formula, at least one organosilicon compound of the formula

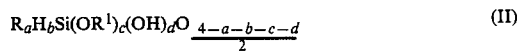

$$R_aH_bSi(OR^1)_c(OH)_dO_{\frac{4-a-b-c-d}{2}} \quad (II)$$

can be used in the process of this invention and can be present in the powders prepared in accordance with this invention, in which R represents the same or different monovalent hydrocarbon radicals or halogenated monovalent hydrocarbon radicals having from 1 to 18 carbon atoms per radical, R$^1$ represents the same or different alkyl radicals having from 1 to 4 carbon atoms per radical, a is 0, 1, 2 or 3, with an average of from 0.00 to 1.8, b is 0 or 1, with an average of from 0.00 to 1, c is 0, 1, 2 or 3, with an average of from 0.01 to 2.0, and d is 0, 1, 2 or 3, with an average of from 0.00 to 0.5.

Examples of hydrocarbon radicals represented by R are alkyl radicals, such as the methyl, ethyl, n-propyl, isopropyl, 2-ethylhexyl, butyl, hexyl and octadecyl radicals; hydrocarbon radicals having at least one aliphatic double bond, such as the vinyl, allyl, ethylallyl and butadienyl radicals; cycloalkyl and alkylcycloalkyl radicals, such as the cyclohexyl radical and methylcyclohexyl radicals; aryl radicals, such as the phenyl radical and xenyl radicals; alkaryl radicals, such as the tolyl radicals; and aralkyl radicals, such as the benzyl radical.

Examples of halogenated hydrocarbon radicals represented by R are the 3,3,3-trifluoropropyl radical and the chlorophenyl radicals.

Hydrocarbon radicals which are free of aliphatic double bonds are the preferred radicals represented by R.

The alkyl radicals represented by $R^1$ can be methyl, ethyl, n-propyl, isopropyl, n-butyl, sec-butyl or tert-butyl radicals.

In the process of this invention, an organosilicon compound of formula (II) is preferably used in addition to the organopolysiloxane containing Si-bonded hydrogen in an amount up to 400 percent by weight, based on the weight of the organopolysiloxane of formula (I). The powders prepared in accordance with this invention, likewise, preferably contain an organosilicon compound of formula (II) in an amount up to 400 percent by weight, based on the weight of the organopolysiloxane of formula (I).

The water-soluble, film-forming polymers having a turbidity point from 35° to 98° C., preferably from 40° C. to 95° C., may be, for example, polyvinyl alcohols which have been prepared by partially saponifying polyvinyl acetate so that it has a saponification number (mg of KOH which are necessary for the saponification of the remaining acetyl groups) of from 150 to 240, and more preferably from 170 to 230, and a molecular weight from 15,000 to 100,000, preferably from 20,000 to 75,000, as determined by a viscometer, hydroxypropylcellulose, aminoethylhydroxypropylcellulose, hydroxypropylmethylcellulose or hydroxyethylmethylcellulose, modified starches or mixtures of at least two such polymers. Polyvinyl alcohols prepared by partially saponifying polyvinyl acetate are particularly preferred.

The turbidity point values specified herein were determined in accordance with DIN (Deutsche Industrie Norm) 53 917 (January 1981) for the polymer dissolved in pure water.

In the preparation of the powders prepared by spray-drying and used in accordance with this invention, a water-soluble, film-forming polymer having a turbidity point of from 35° to 98° C. is preferably employed in an amount of from 3 to 60 percent by weight, and more preferably from 5 to 15 percent by weight, based on the total weight of the organosilicon compound used in the preparation of the powder. Accordingly, the powders of this invention preferably contain a water-soluble, film-forming polymer having a turbidity point of from 35° C. to 98° C. in an amount of from 3 to 60 percent by weight, and more preferably from 5 to 15 percent by weight, based on the total weight of the organosilicon compound used in the preparation of the powder.

The amount of water in the mixtures to be spray-dried is preferably from 45 to 95 percent by weight, and more preferably from 60 to 85 percent by weight, based on the total weight of the mixture to be spray-dried.

The spray-drying of the mixtures containing at least water, a polysiloxane containing Si-bonded hydrogen and a water-soluble, film-forming polymer having a turbidity point from 35° C. to 98° C. can be carried out in a warmed stream of dry gas in any apparatus known in the art, which is suitable for spray-drying liquids, such as those, for example, having at least one swirl spray nozzle or having a rotating spray disk.

The temperature at which the stream of dry gas, which is preferably air, enters the spray-drying apparatus is preferably from about 110° C. to 250° C., and the exit temperature of the stream of gas formed during drying is preferably from about 60° to 100° C., and more preferably from 65° to 95° C.

In addition to an organosilicon compound and a water-soluble, film-forming polymer having a turbidity point of from 35° to 98° C., the powders produced by spray-drying and used in the process of this invention or contained in the gypsum powders of this invention may, if desired, contain additional substances, but preferably only in an amount which will ensure that the powders produced by spray-drying contain from 40 to 97 percent by weight, and more preferably from 70 to 90 percent by weight of organosilicon compound, based on the total weight of the powder (calculated as anhydrous powder). Examples of such additional substances are water-miscible solvents, such as diacetone alcohol, water-immiscible solvents, such as mixtures or xylene isomers, ionogenic or nonionogenic emulsifiers other than the water-soluble, film-forming polymers having a turbidity point of from 35° to 98° C., such as sodium laurylsulfate, fungicides, defoamers, soluble dyes, pigments, fillers, or anticaking agents having a surface area of at least 50 m$^2$/g, such as pyrogenically produced silicon dioxide, fillers or anticaking agents having a surface area of less than 50 m$^2$/g, such as chalk powder, calcium carbonate needles and quartz sand, and also condensation catalysts, such as di-n-butyltin dilaurate, di-2-ethylhexyltin dilaurate, zirconium octoates, titanium butylates and platinum compounds or platinum complexes.

In addition to the mixture containing water and at least an organopolysiloxane which contains Si-bonded hydrogen and a water-soluble, film-forming polymer having a turbidity point of from 35° to 98° C., anticaking agents, as well a the abovementioned additional substances, may at least partly, be introduced into the spray-drying apparatus separate from the mixture containing the organopolysiloxane which is fed to the spray-drying apparatus, and/or they can be mixed with the spray-dried material before it enters the collecting vessel. The antiblocking agents are usually inorganic solids having an average particle size of from 0.001 to 50 microns, and more preferably from 0.01 to 0.1 microns. These anticaking agents may be, for example, aluminum silicates, colloidal silica gel, precipitated silicon dioxide having a surface area of at least 50 m$^2$/g, pyrogenically produced silicon dioxide, ground clays, light spar, talc, cements, chalk powder or diatomaceous earth.

These anticaking agents may be treated, for example, with hexamethyldisiloxane to render them hydrophobic.

If anticaking agents are employed, they are preferably employed in an amount of from 0.5 to 20 percent by weight and more preferably in an amount of from 1 to 5 percent by weight, based on the total weight of the organosilicon compound contained in the powder.

In the process of this invention, the powder which contains at least an organosilicon compound of formula (I) and a water-soluble, a film-forming polymer having a turbidity point of from 35° to 98° C. is preferably added to gypsum in an amount of from 0.05 to 5 percent by weight, and more preferably from 0.2 to 1.0 percent by weight, based on the weight of the gypsum.

Therefore, the gypsum powders of this invention contain at least an organosilicon compound of formula (I) and a water-soluble polymer having a turbidity point of from 35° to 98° C., preferably in an amount of from 0.05 to 5 percent by weight, and more preferably from 0.2 to 1.0 percent by weight, based on the weight of the gypsum present in the gypsum containing powder.

In addition to gypsum and the spray-dried powder of this invention, the gypsum used in the process of this invention and the gypsum powder of this invention can contain additives and aggregates which are conventionally employed in gypsum. Examples of such additional substances are set accelerators and retardants, such as potassium sulfate, calcium dihydrate, sodium citrate and potassium tartrate, starch and thickeners.

In the process of this invention, the powder prepared by spray-drying a mixture containing water, an organopolysiloxane containing Si-bonded hydrogen and a water-soluble, film-forming polymer having a turbidity point of from 35° to 98° C. can be added to dry gypsum powder or may be added to gypsum mixed with water. Preferably, the dry powder prepared by spray-drying and containing the organopolysiloxane having Si-bonded hydrogen is mixed with the dry gypsum powder.

The process of this invention and the gypsum powders prepared according to this invention can be used where it is desired to produce water-repellent articles, such as molded articles, coatings or for filling joints or similar spaces, for example, in preparing filler materials, joint sealants, plaster cements and gypsum plasters, and also in the preparation of gypsum tiles and plasterboard. The gypsum tiles and plasterboard may be prepared using fully automated production equipment.

Surprisingly, it was found that the relatively high proportion of water-soluble polymer employed to ensure redispersibility of the organosilicon compound does not substantially impair the water-repellency of articles prepared by the process of this invention or articles prepared from the gypsum powder of this invention.

In the following examples, all parts and percentages are by weight, unless otherwise specified.

EXAMPLE 1

(a) An emulsion containing 450 parts of a methylhydrogenpolysiloxane which is end blocked by trimethylsiloxy groups and has a viscosity of 20 $mm^2.s^{-1}$ at 25° C., 50 parts of a polyvinyl alcohol which has been obtained by partially saponifying polyvinyl acetate and has a saponification number of 223, a molecular weight of 27,000 as determined by a viscometer and a turbidity point of 45° C., and 1,450 parts of water is converted into a powder in a spray dryer (Nubilosa AJM 014, the name "Nubilosa" is a registered trademark) operating with a swirl spray nozzle at a nozzle pressure of 5,300 hPa (abs.), a throughput of 2 liters per hour, an air inlet temperature of 165° C. and a gas outlet temperature of 85° C. Silicon dioxide which has been treated with hexamethyldisiloxane and which has a BET surface area of 110 ±30 $m^2/g$ is added to the powder before it enters the collecting vessel at the rate of two percent by weight based on the weight of the organopolysiloxane contained in the powder. (b) A powder whose preparation is described in (a) above is mixed, in the amounts specified in Table I, with gypsum powder in a mixer (ribbon blender model 1551 from Tonindustrie Pruftechnik GmbH, D-1000 Berlin). About 0.8 part of demineralized water per part of gypsum is added to the mixture thus obtained. The gypsum slurries thus obtained are stirred for 30 seconds in a turbine stirrer operating at 1,000 revolutions per minute and then cast in cylindrical molds (diameter: 8 cm, height: 2 cm) made from polyvinyl chloride. After solidification, the gypsum disks thus obtained are stored in air for 24 hours at 40° C. and for 6 days at room temperature. The gypsum disks thus dried are then weighed and placed in water for 2 hours, the surface of the water being 5 cm above the gypsum disks. Finally, the gypsum disks are removed from the water, the excess water is allowed to drip off, and the disks reweighed.

TABLE I

| Amount of powder added to the gypsum, percent based on the weight of gypsum powder. | Percent increase in weight through water absorption. |
|---|---|
| 0.0+ | 47.5 |
| 0.2 | 13.0 |
| 0.3 | 7.7 |
| 0.5 | 3.3 |
| 1.0 | 2.5 |

(+) = comparison example.

EXAMPLE 2

The powder prepared in accordance with Example 1(a) above, is mixed in each case in the amount specified in the following table with 80 parts of demineralized water. The aqueous dispersions thus obtained are in each case mixed with 100 parts of dry gypsum. Gypsum disks are prepared from the gypsum slurries thus obtained and treated in accordance with the procedure in Example 1(b).

TABLE II

| Amount of powder added to the gypsum, percent based on the weight of gypsum powder. | Percent increase in weight through water absorption. |
|---|---|
| 0.2 | 25.0 |
| 0.3 | 5.4 |
| 0.5 | 1.7 |
| 1.0 | 1.1 |

The following comparison examples were carried out to show that the relatively high proportion of water-soluble polymer employed to ensure redispersibility of the organosilicon compound does not substantially impair the water-repellency of articles prepared from the gypsum powders of this invention.

COMPARISON EXAMPLE (a)

An emulsion is prepared from 0.45 part of the methylhydrogenpolysiloxane which is endblocked by trimethylsiloxy groups and which has a viscosity of 20 $mm^2.s^{-1}$ at 25° C. and 80 parts of deionized water, in 30 seconds using a turbine stirrer operating at 1,000 revolutions per minute. About 100 parts of dry gypsum are added to this emulsion, and the mixture thus obtained is stirred for 30 seconds using the turbine stirrer operating at 1,000 revolutions per minute. Gypsum disks are prepared from the gypsum slurry thus obtained and treated in accordance with the procedure described in Example 1(b). The increase in weight through water absorption is 3.5 percent.

COMPARISON EXAMPLE (b)

About 0.6 part of an emulsion prepared from 50 percent by weight of methylhydrogenpolysiloxane which is endblocked by trimethylsiloxy groups and has a viscosity of 20 $mm^2.s^{-1}$, 2.5 percent of the polyvinyl alcohol described in Example 1(a) above, and 47.5 percent of water, are mixed with 80 parts of water and 100 parts of dry gypsum. The resultant mixture is stirred for 30 seconds using a turbine stirrer operating at 1,000 revolutions per minute. Gypsum disks are prepared and treated in accordance with the procedure of Example 1(b). The increase in weight through water absorption is 3.1 percent.

What is claimed is:

1. A process for preparing water-repellent articles which comprises forming a mixture containing gypsum, water and from 0.05 to 5 percent by weight based on the weight of gysum of a powdered hydrophobic agent in which the powdered hydrophobic agent is obtained by spray-drying a mixture containing an organopolysiloxane having Si-bonded hydrogen and a water-soluble, film-forming polymer having a turbidity point of from 35° to 98° C., and thereafter molding the resultant mixture.

2. A gypsum powder containing from 0.05 to 5 percent by weight based on the weight of gypsum of a hydrophobic agent, in which the hydrophobic agent is obtained by spray-drying a mixture containing water, an organopolysiloxane containing Si-bonded hydrogen and a water-soluble, film-forming polymer having a turbidity point of from 35° to 98° C.

3. The process of claim 1, wherein the water-soluble, film-forming polymer having a turbidity point of from 35° to 98° C. is a polyvinyl alcohol that has been prepared by partial saponification of polyvinyl acetate, and has a saponification number of from 170 to 230 and a molecular weight of from 20,000 to 75,000 as determined by a viscometer.

4. The powder of claim 2, wherein the water-soluble, film-forming polymer having a turbidity point of from 35° to 98° C. is a polyvinyl alcohol that has been prepared by partial saponification of polyvinyl acetate and has a saponification number of from 170 to 230 and a molecular weight of from 20,000 to 75,000.

* * * * *